July 13, 1954  G. F. McFADDEN  2,683,528
SHIPPING RETAINER FOR RAILWAY JOURNAL BOXES
Filed July 11, 1950  2 Sheets-Sheet 1
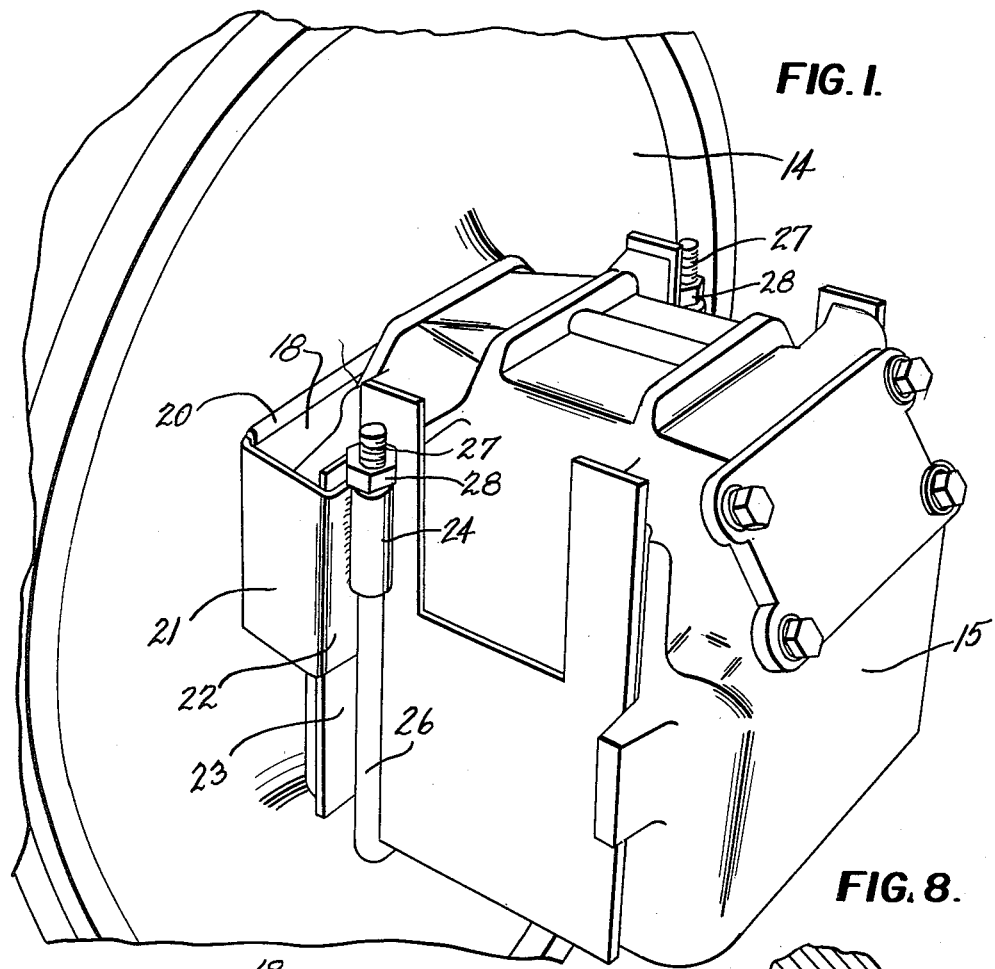
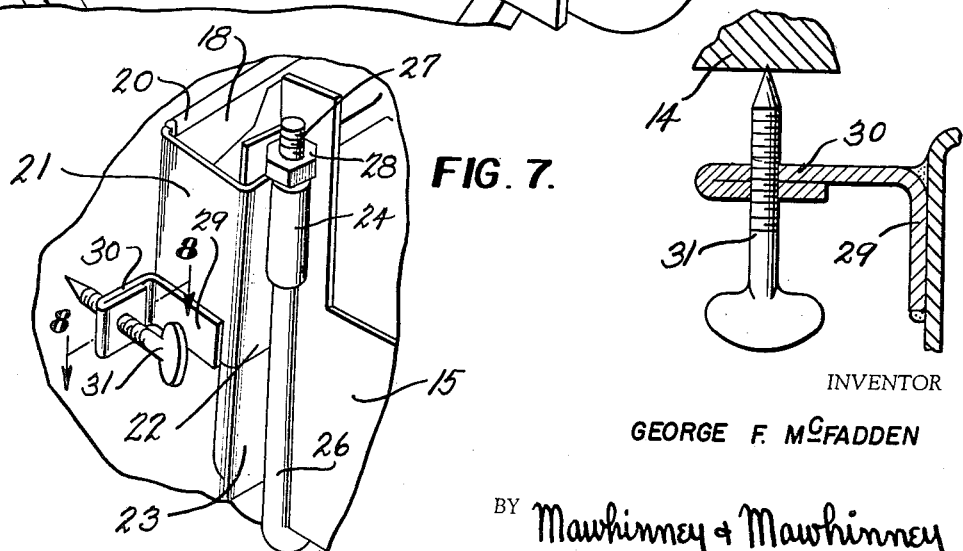
INVENTOR
GEORGE F. McFADDEN
BY Mawhinney & Mawhinney
ATTORNEYS July 13, 1954
G. F. McFADDEN
2,683,528
SHIPPING RETAINER FOR RAILWAY JOURNAL BOXES
Filed July 11, 1950
2 Sheets-Sheet 2
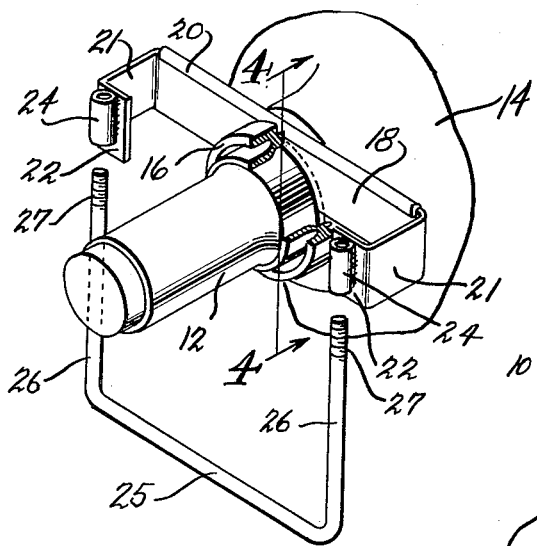
FIG. 2.
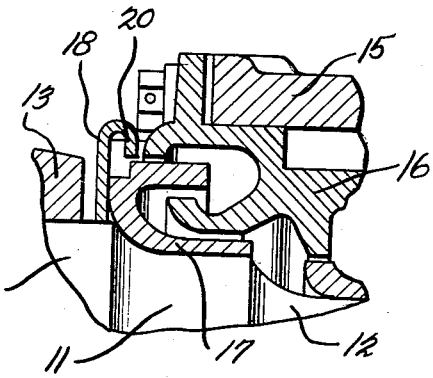
FIG. 3.
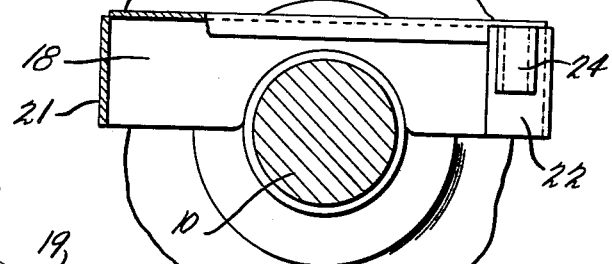
FIG. 4.
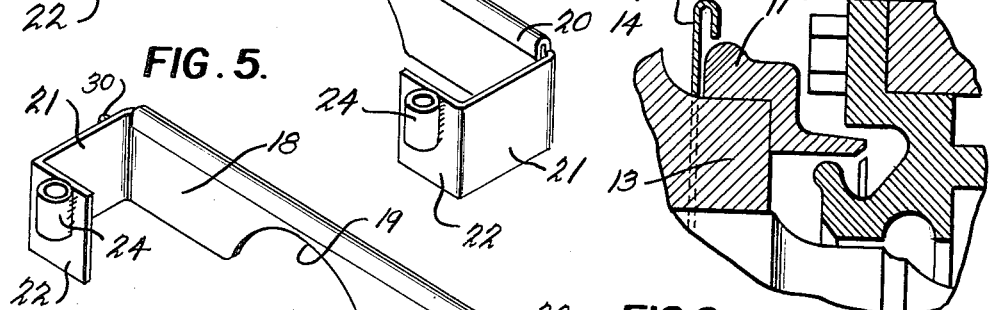
FIG. 5.
FIG. 6.
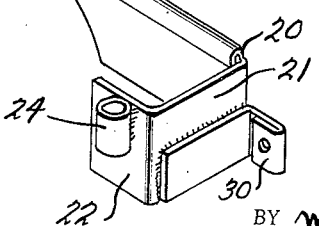
FIG. 9.
INVENTOR
GEORGE F. McFADDEN
BY Mawhinney & Mawhinney
ATTORNEYS Patented July 13, 1954

2,683,528

UNITED STATES PATENT OFFICE 2,683,528

SHIPPING RETAINER FOR RAILWAY JOURNAL BOXES

George Francis McFadden, Roanoke, Va., assignor to Charles M. O'Boyle, Wilmington, Del.

Application July 11, 1950, Serial No. 173,100

7 Claims. (Cl. 206—46)

When Hyatt journal boxes are mounted on an axle that is in place in a car truck, the movement of the journal box lengthwise of the axle is restricted by flanges, cast integrally with the box, that come into contact with the pedestals of the truck frame.

When wheel and axle assemblies are removed from a truck frame for turning or replacing of wheels, replacing of worn bearings or for any other reason, the journal box is removed from the axle by sliding it lengthwise of the axle. This is easily done because there is nothing to interfere with the lengthwise movement of the journal box on the axle after the wheel and axle assembly has been removed from the truck frame.

Wheel axle and bearing repairs are usually concentrated at one or more points on a railroad due to the special machine tool equipment needed to perform this work. Trucks can be assembled at any point having crane facilities of sufficient capacity. It is frequently necessary therefore to ship wheel and axle assemblies from a truck assembly point to the wheel and axle shops, and after the machine work has been done to ship them back to the truck assembly point. It is also desirable to ship the wheel and axle assemblies with the journal boxes mounted in place to prevent damage to the journal bearings in the boxes and the bearing races on the axle.

Hyatt journal bearing boxes are equipped with a water guard that protrudes through an opening in the rear end cap of the box. This water guard is applied to the dust guard portion of the axle with a shrink fit. There is a space of $\frac{3}{16}$" to $\frac{1}{4}$" between the face of the wheel hub and the end of the water guard of the journal box.

The water guard and the space between the water guard and the face of the wheel hub is utilized by my improved retainer to hold the journal box on the axle.

It is the primary object and purpose of the invention to provide a retainer which has one member engaged with the journal box and another member coupled thereto and fitting behind the water guard in the space referred to so as to prevent the journal box from having such lengthwise sliding movement on the axle as would permit the removal of the journal box.

It is another object of the present invention to provide a simple form of retaining device possessing adequate strength for the job and admitting of ease of application and removal.

A further object of the invention is to unite with such a retainer a device for preventing rotation of the journal box on the axle.

According to a modified form of the invention the water guard may be shrunk on the hub of the wheel, in which case the inner retaining member is fitted to the wheel hub back of such water guard.

With the foregoing and other objects in view, the invention will be more fully described hereinafter, and will be more particularly pointed out in the claims appended hereto.

In the drawings, wherein the symbols refer to like or corresponding parts throughout the several views.

Figure 1 is a fragmentary perspective view of a railway journal box and wheel assembly showing applied thereto an improved shipping retainer constructed in accordance with the present invention.

Figure 2 is also a fragmentary perspective view of the axle and wheel hub and water guard partly broken-away and partly shown in section and with the improved retainer shown in applied position between the water guard and the front face of the wheel hub.

Figure 3 is a fragmentary vertical section taken through a railway car axle showing the wheel set, with the wheel hub thereon, the dust guard portion of the axle with the water guard mounted thereon, a portion of the journal and journal box and with the improved retainer member or plate shown fitted between the wheel hub and the water guard.

Figure 4 is a cross-section taken on the line 4—4 of Figure 2.

Figure 5 is a perspective view of one form of the retainer omitting the U-bolt.

Figure 6 is a similar view of a slightly modified form of a retainer.

Figure 7 is a fragmentary perspective view of the journal box and wheel assembly with the modified form of retainer applied thereto.

Figure 8 is a horizontal section taken on the line 8—8 of Figure 7, and

Figure 9 is a vertical section showing the mounting of the water guard and shipping retainer on the wheel hub.

Referring more particularly to the drawings 10 designates the wheel seat of a railway car axle, 11 the dust guard portion of the axle and 12 the journal.

The wheel hub is indicated at 13 and the wheel at 14, such wheel hub being mounted upon the wheel seat 10. A conventional journal box is indicated at 15, the same having a rear end cap 16. A conventional form of water guard 17 is shown as tightly shrunk upon the dust guard portion 11 of the axle.

In this construction there is a narrow space between the front face of the wheel hub 13 and the inner end of a water guard 17 at the base of which space is exposed the front portion of the wheel seat 10.

The foregoing parts are old and well-known in railway car construction and I propose to take advantage of the space between the wheel hub 13 and the water guard 17 and of the exposed portion of the wheel seat portion 10 of the railway car axle in order to fit a shipping retainer, one form of which is shown more particularly in Figures 2 to 5 inclusive.

According to this form of the invention the improved device comprises a retainer member or plate 18 of sheet steel or other rigid material having a part-circular cut-out 19 opening through its lower central portion to conform to the curvature of the wheel seat 10 down against which it is adapted to be forcibly drawn as hereinafter described. The upper edge of this member or plate 18 is beaded over or turned as indicated at 20 to reinforce the plate and to add to the strength thereof. The ends of the plate of member 18 support outwardly extending side walls 21 and the outer ends of the side walls 21 support inturned flanges 22. Although these various parts may be made separately; in the preferred form the plate 18, side walls 21 and inturned flanges 22 are all made integrally of suitable rigid stock bent to substantially the form shown in which the inturned flanges 22 are adapted to extend in front of the rear pedestal flanges 23 of the journal box.

The inturned flanges 22 carry ferrules or sleeves 24 which may be secured to their outer faces by welding or otherwise. A U-bolt may be employed to clamp the retainer member 18 to the journal box 15 and such U-bolt comprises a cross member 25 having the legs 26 which are threaded at their upper ends 27 to detachably receive the nuts 28. The legs 26 of the U-bolt are adapted to pass freely through the ferrules 24 with the threaded portions 27 projecting above such ferrules and the nuts 28 are adapted to be tightened down upon the upper ends of such ferrules 24.

According to a modified form of the device brackets may be affixed or carried by the outer faces of the side walls 21, such brackets comprising shanks 29 having doubled flanges 30 turned outwardly at approximately right angles to the shanks and being perforated and screw threaded to receive pointed thumb screws 31 in position to engage against the outer surface of the car wheel 14.

Referring more particularly to Figure 9, a water guard 17a of a modified form is shown as shrunk directly on the wheel hub 13 and in this case the shipping retainer plate or member 18 is mounted on the wheel hub 13 back of such water guard 17a.

In the use of the device, the plate or member 18 is made to fit the surface of the dust guard portion of the axle in the space referred to while the inturned flanges 22 of this plate contact the outer surfaces of the rear pedestal flanges 23 of the journal box. This outward longitudinal movement of the journal box 15 is prevented by the immobility of the water guard 17 or 17a due to its shrink fit on the dust guard portion 11 of the axle or on the wheel hub 13 as the case may be.

The water guard 17 is a machined steel forging and is shrunk on the dust guard portion 11 of the axle, or according to Figure 9 on the wheel hub 13. It prevents the entrance into the journal box of dirt, dust and water, and remains in place on the axle for the life of the wheel.

Rotation of the journal box on the axle is prevented by clamping action of the U-bolt 25, 26 which forces the circular surface 19 of the retainer member 18 down tightly upon the surface of the dust guard portion 11 of the axle between the outside of the wheel hub 13 and the water guard 17.

Another advantage in transporting the wheel and axle assembly with the journal box mounted in place on the axle is that all dirt, dust and water is excluded from the journal box.

If desired the brackets 29, 30 and the thumb screws 31 may be added to the retainer. By tightening the thumb screws the pointed ends thereof may bite into the outer faces of the wheel discs and also assist to prevent rotation of the journal boxes on the axles.

The device is applied by sliding the same from above downwardly with the plate or member 18 at its circular part 19 fitting back of the water guard or 17 or 17a and with the inturned flanges 22 sliding down in front of the rear pedestal flanges 23 of the journal box so that the member 18, 20, 21 constitutes an interlocking arrangement which by gravity will tend to remain in place and will hold the journal box against sliding movement. The U-bolt forms a second retaining member which interlocks with the journal box and with the retainer plate member to prevent accidental or casual displacement of the retainer member from its position back of the water guard and forwardly of the pedestal flanges, and such U-bolt retaining member performs the added function of drawing down the retaining plate member forcibly and frictionally upon the axle or wheel hub with such force as to brake the journal box 15 from rotary movement on the axle.

Although I have disclosed herein the best form of the invention known to me at this time, I reserve the right to all such modifications and changes as may come within the scope of the following claims.

What I claim is:

1. A clamping structure comprising a plate having a lower edge and an arcuate cut-out portion opening through said lower edge, parallel side walls laterally extending from the ends of the plate, inturned flanges on the ends of the side walls paralleling the plate in confronting relation thereto and having ferrules on their outer surfaces and a U-shaped element having threaded free ends extending through the ferrules and nuts on the ends to attach the U-shaped element to the flanges.

2. A clamping structure comprising a flat retaining member having a lower edge and a cut-out portion opening through the lower edge, flanges on the ends of the retaining member spaced therefrom in confronting parallel relation thereto and a U-shaped member having its free ends removably attached to the flanges.

3. For use with a railway axle assembly including an axle, a journal box enclosing the journal of the axle and a fixedly mounted element on said axle, a device adapted to cooperate with the element for retaining the journal box in position during shipping of the axle assembly comprising means securable to a portion of the journal box to clamp the journal box to the element and retaining means for said last-named means attachable to the element.

4. For use with a railway axle assembly including an axle, and a journal box enclosing the journal of the axle, a shipping retainer for the journal box comprising means securable to the axle inwardly of the journal box, retaining means engageable with said last named means, securing means connecting the retaining means to the said means, and means connecting said retaining means to a portion of the journal box to clamp the journal box to the said means.

5. For use with a railway axle assembly including an axle, a journal box enclosing the journal of the axle, and fixedly mounted element on said axle, means adapted to cooperate with the element for retaining the journal box in position during shipping of the axle assembly comprising a retaining member attachable to the element and means carried by said retaining member securable to a portion of the journal box to clamp the journal box to the element.

6. For use with a railway wheel assembly including an axle, a journal box enclosing the journal of the axle and having rear pedestal flanges, and a water guard for the inner end of the box fixedly carried by the axle, means for retaining the journal box in position during shipping of the wheel assembly comprising a member positionable back of the water guard, flanges carried by the member in spaced relation thereto and positionable in front of the rear pedestal flanges of the journal box, a retaining element engageable under the journal box and having attaching members extendable upwardly along the sides of the box and means for connecting the attaching members to the flanges to bind the box against rotation.

7. A railway axle assembly for shipping including an axle, a journal box enclosing the journal of the axle and having pedestal flanges, a water guard for the inner end of the box fixedly carried by the axle, a device retaining the journal box in position during shipping of the assembly having a part fitting back of the water guard and having other parts fitting in front of the pedestal flanges of the journal box, and means extending beneath the journal box connecting said other parts for preventing displacement of said device from the water guard.

References Cited in the file of this patent

UNITED STATES PATENTS

| Number | Name | Date |
|---|---|---|
| 1,568,014 | Watson | Dec. 29, 1925 |
| 2,459,879 | Hardwick | Jan. 25, 1949 |
| 2,465,944 | Taylor et al. | Mar. 29, 1949 |